June 14, 1949.
H. O. KLINKE
2,472,951
METHOD AND APPARATUS FOR CONTROLLING TORCH SPACING
Filed Sept. 10, 1946
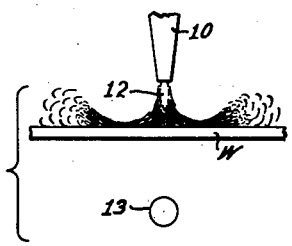
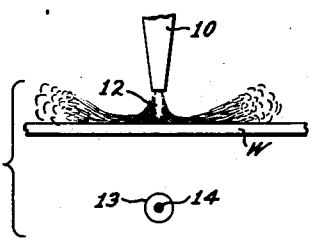
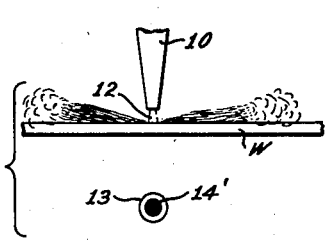
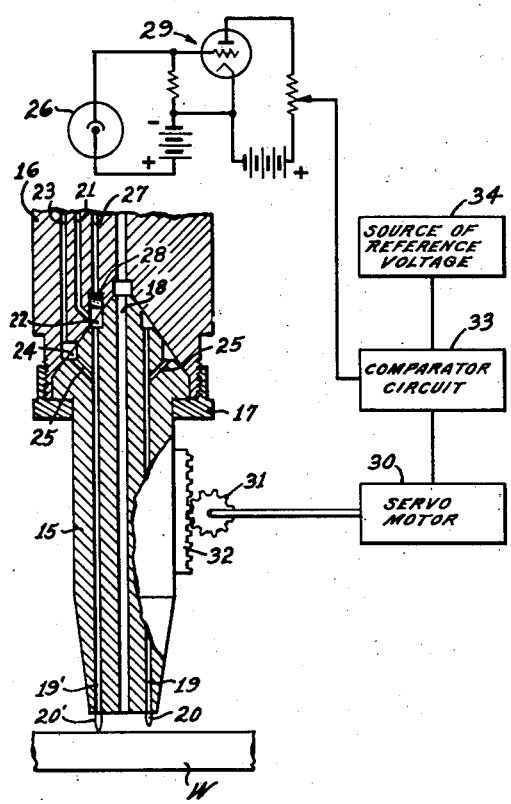
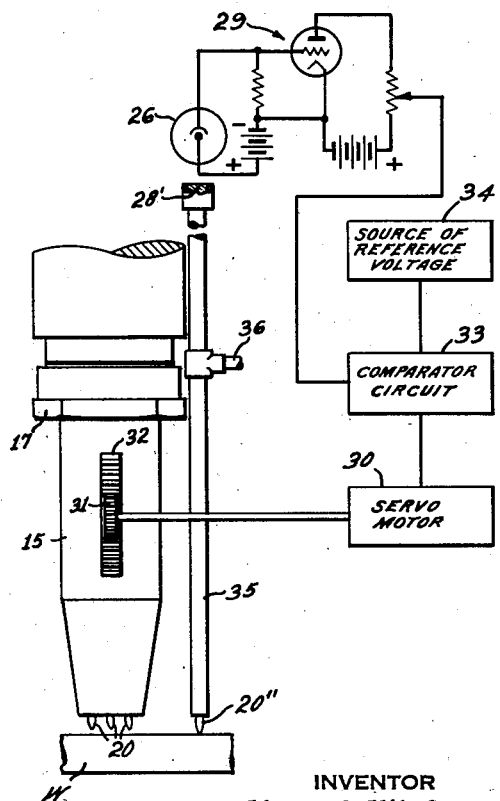
INVENTOR
Henry O. Klinke
BY
ATTORNEYS Patented June 14, 1949

2,472,951

UNITED STATES PATENT OFFICE 2,472,951

METHOD AND APPARATUS FOR CONTROLLING TORCH SPACING

Henry O. Klinke, Forest Hills, N. Y., assignor to Air Reduction Company, Incorporated, a corporation of New York Application September 10, 1946, Serial No. 695,910

7 Claims. (Cl. 148—9)

This invention relates to a method and apparatus for controlling the spacing between the tip of a gas torch and the surface of a work-piece that is being cut, welded, or otherwise acted upon by the torch.

In mechanical cutting, welding, or heat-treating apparatus it is desirable to maintain the tip of the gas torch a uniform distance from the work surface, and it is the principal object of this invention to provide an improved method and apparatus by which this is automatically accomplished.

When the inner cone of an oxyacetylene flame is viewed internally, that is, through the passage which feeds gas to the flame, it shows a bright white light when the cone is out of contact with the work. When the inner cone touches the work a dark spot appears at the center of the light area and the dark spot increases in size as the tip moves closer to the work.

According to the invention the variations in the amount of light that can be seen within the inner cone of the flame when the spacing between the torch tip and the work departs from a desired normal are utilized to automatically move the torch tip toward and away from the work surface to thereby maintain the spacing substantially at the desired normal. Photo-electric means, including a photo-electric cell which is located in line with a passage that feeds gas to a flame so that the cell is under the influence of the above-mentioned light variations, converts the light variations into a varying electric current, and the changes in value of such current are utilized to move the torch tip toward and away from the work to keep it spaced a substantially constant distance from the work surface. The control flame may be one of the usual preheating flames of the torch or a separate flame provided for the purpose.

Several forms of apparatus embodying the invention and that are adapted for use in carrying out the method are illustrated more or less diagrammatically in the accompanying drawing, in which:

Figs. 1 to 3 inclusive are explanatory views showing how the amount of light at the area where the inner cone of the flame impinges on the work varies in accordance with the degree of spacing between the torch tip and the work surface;

Fig. 4 shows a torch tip in vertical section, in combination with control means, diagrammatically represented, for moving the torch tip toward and away from the work in response to the kind of light variations depicted in Figs. 1 to 3, the control flame in this form of the invention being one of the preheating flames of the torch in which the orifice is modified to produce a longer flame; and Fig. 5 illustrates a modification of the invention in which the control flame is a special flame provided for the purpose instead of one of the usual preheating flames, the torch tip in this figure being shown in side elevation.

Referring to Figs. 1 to 3, a portion of a torch tip is represented at 10 having a gas passage that feeds a combustible gas mixture to an oxyacetylene flame whose inner cone is shown at 12. The work is represented at W. As stated above, if the inner cone of the flame is viewed internally, i. e. by looking downwardly through the gas passage, the cone when not in contact with the work W, which is the condition depicted in Fig. 1, shows a bright white light represented by the circle 13 in this figure. When the flame cone just touches the work as depicted in Fig. 2, a dark spot appears at the center of the light area 13 as shown at 14 in this figure. As the distance between the torch tip and the work becomes still less as shown in Fig. 3, the dark spot increases in size as indicated at 14' in this figure. This variation in the amount of light at the area where the inner cone of the flame impinges on the work, resulting when the tip spacing changes, due, for instance, to irregularities in the work surface, is made use of to control the tip spacing and maintain it substantially constant in the manner shown in Figs. 4 and 5.

Referring first to the form of the invention illustrated in Fig. 4, a torch tip 15 is clamped to a torch head 16 by a tip nut 17 in the usual way. The particular tip shown in the drawing is of the type commonly used on cutting torches, having a central passage 18 for the cutting oxygen, and a number of surrounding passages 19 and 19' for feeding a combustible gas mixture to the preheating flames 20 and 20'. Fuel-gas, such as acetylene, is delivered by means of a conduit 21 to an annular recess 22 in the conical upper end of the tip from which it is distributed to the passages 19 and 19'. Preheating oxygen is delivered by means of a conduit 23 to a second annular recess 24 in the conical upper end of the tip from which it is conducted to the passages 19 and 19' by diagonal ports 25 and mixes with the fuel-gas delivered to these passages from the annular recess 22. The passage 19' of which there is only one, terminates in an orifice of smaller diameter than do the passages 19. This results in a flame 20' having a longer inner cone which impinges on the work-piece when the torch is properly positioned.

At a convenient location within the torch body there is positioned a photo-electric cell 26 so that it is in line with the preheat passage 19'. A viewing passage 27 extends from the cell to the preheat passage with which the cell is in alignment. At the lower end of the viewing passage there is a quartz window 28 which prevents gas from flowing through the viewing passage toward the photo-electric cell but permits light rays to pass upwardly into the viewing passage from the preheat passage that is in line with it.

The photo-electric cell is connected in a vacuum tube amplifying circuit denoted in general by the reference numeral 29. The variations in the amount of light received by the photo-electric cell are converted by it and its associated circuit and instrumentalities into variations in a control voltage which may be utilized in any suitable way to produce movement of the torch tip toward and away from the work. For example, a servomotor diagrammatically represented at 30 may be operatively connected to the torch tip by a pinion 31 driven by the servomotor, meshing with a rack 32 on the torch tip. The servomotor is operated by the control voltage from the photo-electric cell circuit in any known way, as by comparing the output voltage of the photo-electric cell circuit in a comparator circuit 33 with a reference voltage derived from a source 34. This may be done by placing the control voltage and reference voltage on the grids of two vacuum tubes or thyratrons, and feeding their respective plate currents into opposing field windings of a servomotor to thus determine the magnitude and direction of the mechanical torque produced.

It will now be seen that if the spacing between the torch tip and the work surface departs from a desired normal, due to irregularities in the work surface or any other cause, the change in the amount of light at the area where the inner cone of the control preheating flame impinges on the work surface will affect the photo-electric cell in line with the passage that feeds gas to such preheating flame and through the control mechanism above described, will move the torch tip toward or away from the work surface until the spacing is restored to the desired normal.

Instead of using one of the preheating flames of the torch as a control flame, a special control flame may be provided. A modification of the invention in which such a special control flame is used is illustrated in Fig. 5. In this case a control flame 20'' is provided fed with a combustible gas mixture through tube 35 positioned alongside of the torch tip and secured to the torch or the tip in any suitable way. The gas mixture is supplied to the tube 35 through a gas inlet 36. A quartz window 28' is positioned in the tube above the gas inlet and the photo-electric cell 26 is positioned above the quartz window in line with the tube 35. The means for moving the torch tip toward and away from the work in response to the light variations affecting the photo-electric cell may be the same as the means shown in Fig. 4. The apparatus of Fig. 5 operates in the same way as that shown in Fig. 4 except that the photo-electric cell is under the influence of the light received from the tip of the inner cone of the special control flame 20'' instead of from the tip of the inner cone of a long preheating flame 20'.

While the invention has been described in connection with the tip of a cutting torch, it may be used to maintain a substantially constant tip spacing with any other type of flame torch, such as a welding torch or a torch used for heat-treating operations. Any flame jet of the torch may be used as the control flame or any suitable means may be used to provide a special control flame which is supplemental to the usual torch flame or flames.

I claim:

1. In using gas torches in which the inner cone of the flame when viewed internally through the gas supply passage that feeds the flame shows a light area when the cone is out of contact with the work and shows a dark spot at the center of the light area when the cone touches the work which increases in size as to distance between the torch tip and the work becomes less, the method of preserving a substantially constant spacing between the torch tip and the work surface which comprises photo-electrically converting into electric current variations the variations in the amount of light at the area where the flame cone impinges on the work resulting from the change in the size of said dark spot when the spacing of the tip from the work surface departs from a desired normal, and automatically adjusting the spacing of the torch tip from the work surface in accordance with the variations in said electric current.

2. In using gas torches in which the inner cone of the flame when viewed internally through the gas supply passage that feeds the flame shows a light area when the cone is out of contact with the work and shows a dark spot at the center of the light area when the cone touches the work which increases in size as the distance between the torch tip and the work becomes less, the method of controlling the spacing of the torch tip from the work surface which comprises utilizing the variations in the amount of light at the area where the inner cone of the flame impinges on the work resulting from the change in the size of said dark spot when the spacing of the tip from the work surface departs from a desired normal to photo-electrically produce variations in an electric current, and utilizing the changes in value of said current for moving the torch tip toward and away from the work to keep it spaced a substantially constant distance from the work surface.

3. In using gas torches in which the inner cone of the flame when viewed internally through the gas supply passage that feeds the flame shows a light area when the cone is out of contact with the work and shows a dark spot at the center of the light area when the cone touches the work which increases in size as the distance between the torch tip and the work becomes less, the method of preserving a substantially constant spacing between the tip of the gas torch and the work surface which comprises converting into a varying electric current the variations in the amount of light at the area where the inner cone of the flame impinges on the work resulting from the change in the size of said dark spot when the spacing between the torch tip and the work surface departs from a desired normal, and automatically moving the torch tip toward and away from the work surface in accordance with changes in value of said electric current.

4. In using gas torches in which the inner cone of the flame when viewed internally through the gas supply passage that feeds the flame shows a light area when the cone is out of contact with the work and shows a dark spot at the center of the light area when the cone touches the work which increases in size as the distance between the torch tip and the work becomes less, the method of controlling the spacing of the torch tip from the work surface which comprises photo-electrically converting into a varying electric current the variations in the amount of light at the area where the inner cone of the flame impinges on the work resulting from the change in the size of said dark spot when the spacing between the torch tip and the work surface departs from a desired normal, and automatically moving the torch tip toward and away from the work surface in accordance with the changes in value of said electric current to keep the torch tip spaced a substantially constant distance from the work surface.

5. The combination with a gas torch provided with a tip and adapted to project against the surface of a work-piece a flame having an inner cone, of apparatus for controlling the spacing of the torch tip from the work surface, said apparatus comprising means for converting light variations into a varying electric current, said means being positioned to view the inner cone of the flame internally through its base and to be influenced by the variations in the amount of light at the area where the inner cone of the flame impinges on the work resulting when the spacing of the tip from the work surface departs from a desired normal, means for converting said light variations into a varying electric current, and means controlled by said varying electric current for moving the torch tip toward and away from the work to keep it spaced a substantially constant distance from the work surface.

6. The combination with a gas torch provided with a tip and adapted to project against the surface of a work-piece a flame having an inner cone, of apparatus for controlling the spacing of the torch tip from the work surface, said apparatus comprising a photo-electric device associated with the torch adapted to convert light variations into a varying electric current, said photo-electric device being positioned to view the inner cone of the flame internally through its base and to be influenced by the variations in the amount of light at the area where the inner cone of the flame impinges on the work resulting when the spacing of the tip from the work surface departs from a desired normal, and means controlled by said varying electric current for moving the torch tip toward and away from the work to keep it spaced a substantially constant distance from the work surface.

7. The combination with a gas torch provided with a tip and a gas passage to which gas is supplied for feeding a flame at the discharge orifice of such passage that has an inner cone, of means for controlling the spacing of the torch tip from the surface of a work-piece comprising a photo-electric device positioned in axial alignment with said gas passage to view the inner cone of the flame internally through said gas passage and to be influenced by the variations in the amount of light at the area where the inner cone of the flame impinges on the work resulting when the spacing between the torch tip and the work surface departs from a desired normal, an electric circuit of which said photo-electric device forms a part and including instrumentalities whereby a varying electric current is produced by said light variations, and means controlled by said varying electric current for moving the torch tip toward and away from the work to keep it spaced a substantially constant distance from the work surface.

HENRY O. KLINKE.

REFERENCES CITED

The following references are of record in the file of this patent:

UNITED STATES PATENTS

| Number | Name | Date |
| --- | --- | --- |
| 2,089,015 | Bucknam et al. | Aug. 3, 1937 |
| 2,249,413 | Bechth et al. | July 15, 1941 |
| 2,354,400 | Percy | July 25, 1944 |
| 2,411,737 | Klinke | Nov. 26, 1946 |